(12) United States Patent
Sánchez Martínez et al.

(10) Patent No.: US 12,540,380 B2
(45) Date of Patent: Feb. 3, 2026

(54) METHOD FOR PROTECTING A METAL DURING ANNEALING PROCESSES AND METAL PRODUCT OBTAINED

(71) Applicant: ALUDIUM TRANSFORMACIÓN DE PRODUCTOS, S.L.U., Amorebieta-Etxano (ES)

(72) Inventors: Segundo Antonio Sánchez Martínez, Alicante (ES); Mario Allet, Alicante (ES); Christiane Huber, Alicante (ES)

(73) Assignee: ALUDIUM TRANSFORMACIÓN DE PRODUCTOS, S.L.U., Amorebieta-Etxano (ES)

( * ) Notice: Subject to any disclaimer, the term of this patent is extended or adjusted under 35 U.S.C. 154(b) by 973 days.

(21) Appl. No.: 17/766,222

(22) PCT Filed: Oct. 4, 2019

(86) PCT No.: PCT/ES2019/070670
§ 371 (c)(1),
(2) Date: Apr. 1, 2022

(87) PCT Pub. No.: WO2021/064260
PCT Pub. Date: Apr. 8, 2021

(65) Prior Publication Data
US 2023/0167529 A1    Jun. 1, 2023

(51) Int. Cl.
*C22F 1/00* (2006.01)
*C22F 1/04* (2006.01)

(52) U.S. Cl.
CPC ............... *C22F 1/008* (2013.01); *C22F 1/04* (2013.01)

(58) Field of Classification Search
None
See application file for complete search history.

(56) References Cited

U.S. PATENT DOCUMENTS

| 3,526,551 A | 9/1970 | Sargent |
| 11,258,123 B2 | 2/2022 | Takahagi |
| 2018/0112297 A1 | 4/2018 | Engler |

FOREIGN PATENT DOCUMENTS

| CN | 101077746 A | 11/2007 |
| EP | 1811053 A1 | 7/2007 |
| GB | 1022167 A | 3/1966 |
| WO | 2018124224 A1 | 1/2020 |

OTHER PUBLICATIONS

Office Action \in related patent application EP 19 813 373.8 issued by the European Patent Office and dated Mar. 13, 2024, 5 pgs., in English.

(Continued)

*Primary Examiner* — Anthony M Liang
(74) *Attorney, Agent, or Firm* — Snell & Wilmer LLP

(57) ABSTRACT

A method for protecting a metal during an annealing process, the metal being in the form of a coil or sheets, including placing a protective film between adjacent surfaces of the wraps of the coil or of the sheets, such that the protective film separates the adjacent surfaces of the metal. The metal is subjected with the protective film to the annealing process, the protective film being resistant to temperatures between 200° C. and 360° C. A metal product is obtained by this method.

13 Claims, 3 Drawing Sheets

(56) References Cited

OTHER PUBLICATIONS

International Preliminary Report on Patentability in related application PCT/ES2019/070670 issued by the European Patent Office and having date of completion of Jan. 14, 2022, 5 pages.
Annex to International Preliminary Report on Patentability in related application PCT/ES2019/070670 made by Isabel Pato Vour and having date Nov. 8, 2021, nine pages.
International Search Report in related application PCT/ES2019/070670 issued by the European Patent Office and mailed Jul. 7, 2020, Engl. Translation provided.
Written Opinion of the International Searching Authority in related application PCT/ES2019/070670 issued by the European Patent Office and uploaded to WIPO Patentscope Apr. 8, 2021, in English.
Annex to International Preliminary Report on Patentability in related application PCT/ES2019/070670 made by Isabel Pato Cour and having a date of Nov. 8, 2021, nine pages.
Office Action issued in Chinese Patent Application 201980100913.1 issued by the Chinese State Intellectual Property Office and published on Feb. 28, 2023, 7 pgs. in Chinese, partial machine translation provided.

METHOD FOR PROTECTING A METAL DURING ANNEALING PROCESSES AND METAL PRODUCT OBTAINED

BACKGROUND OF THE INVENTION

1. Field of the Invention

The present invention falls within the scope of the metallurgical industry, and, in particular, of the industry related to metal rolling, more specifically aluminum rolling.

2. Discussion of the Related Art

Rolled metal products, in particular aluminum, can be manufactured by the continuous reduction of the thickness thereof. This process, called rolling, can be carried out starting from a metal plate or a block to be rolled (if direct casting is used), or also from a continuously cast metal with a thickness close to the target thickness (when starting from continuous casting).

During this process, a hardening of the metal occurs as a result of an increase in the structural strength during the hot and cold rolling works (as a consequence of the deformation or elongation produced). The metal is then usually subjected to softening processes by means of thermal annealing treatments in furnaces at high temperature, which enables the possibility of continuing rolling (intermediate annealing process), or achieving specific mechanical characteristics (strength and elongation) that are previously established and that define the final temper or hardness thereof (final annealing process). In this latter case, it can be carried out both directly on the coiled metal and after being cut and stacked in blanks (sheets).

The manufacture of delicate surfaces by means of this rolling process has problems derived from the damage caused during the handling, transport or storage of the metal and, more importantly, during the annealing stage. Thus, the limited surface hardness of the metal means that damage occurs (e.g., marks with variable shape) as a result of the friction between wraps of the coil or between stacked sheets as a result of thermal expansion and contraction phenomena. If a finished product with a high-gloss or highly reflective surface is to be obtained, the problem is compounded since these marks are even more visible, invalidating the metal in many cases.

Therefore, there is a need to reduce the friction or rubbing phenomena between metal sheets or wraps of a coil during the annealing process such that the resulting metal has no significant surface marks or damage.

SUMMARY OF THE INVENTION

In order to overcome the drawbacks of the state of the art, the present invention proposes a surface protection method in rolled metal products when they are subjected to annealing processes, preventing the damage caused by metal-metal contact from occurring. To do so, the present invention is based on the incorporation of a continuous solid layer resistant to high temperatures that is placed between wraps or sheets of metal, thus separating the metal sheets (in a coil or in stacked sheets) in order to prevent damage to the metal when it is subjected to a high-temperature annealing process.

According to a first aspect of the invention, a method is proposed for protecting a metal during an annealing process, the metal being in a coil or in sheets, the method comprising:

placing a protective film between adjacent surfaces of the wraps of the coil or the sheets, such that the protective film separates the adjacent surfaces of the metal;
subjecting the metal with the protective film to the annealing process;
wherein the protective film is resistant to temperatures between 200° C. and 360° C.

The method of the invention has special relevance in those embodiments wherein the metal is aluminum or an aluminum alloy. The present description mainly refers to this metal, although the invention can be extended to other metals produced in an equivalent manner and which are subjected to similar heat treatments. The working range for each metal can be very variable. Normally for annealing and stabilizing aluminum, temperatures above 200° C. are usually considered, while other softer metals or with a lower melting point such as zinc, tin, etc. may require lower temperatures and different ranges.

In certain embodiments the protective film is composed of a material selected from: polytetrafluoroethylene (PTFE) (better known by the trade name Teflon), a fiberglass fabric, a polyparaphenylene terephthalamide fabric (better known by the trade name Kevlar), a silicone compound (such as a high-temperature silicone) or a fiberglass or polyparaphenylene terephthalamide fabric or Kevlar impregnated with polytetrafluoroethylene or Teflon, or a combination of one or more of the above.

In certain embodiments, the resistant film is of the polytetrafluoroethylene- (PTFE) or Teflon-type. This material has the advantage of having a wide working range (up to 360° C. depending on the origin) without changing its chemical and physical characteristics, with an inert behavior when in contact with the metal surface and that enables the reuse thereof for an unlimited number of cycles with an affordable cost for industrial use.

The protective film may have a thickness from 0.01 mm and less than 0.10 mm. In certain embodiments, the protective film has a thickness between 0.02 mm and 0.04 mm to maintain an adequate mechanical strength without significantly altering the total dimensions (larger ranges would cause an important distortion of the profile or geometry of the coil or group of sheets).

In some embodiments, the stage of placing the film between the adjacent surfaces of the metal includes placing the protective film in a continuous manner covering a full length of the surface of the metal. That is, the protective film is arranged in a continuous manner in the longitudinal direction of the metal (direction parallel to that of rolling). In this way, the entire length of the surface of the metal is covered, preventing any damage along the entire length. In addition, the protective film can be recoiled once the heat treatment is finished in order to recover it and subsequently reuse the same in another annealing process.

In some embodiments, the stage of placing the film between the adjacent surfaces of the metal includes placing the protective film covering practically the entire width of the surface of the metal, such that the entirety of the metal is protected by the protective film.

It is desirable not to have an excess protruding from the width of the metal in order to prevent the bare film from coming into direct contact with the overheated gases of the annealing furnace. In fact, in some embodiments, the stage of placing the protective film between the adjacent surfaces of the metal includes placing the protective film covering at least 80% of the width of the surface of the metal. That is to say, the protective film has a geometry such that part of the sides of the surface of the metal is not covered by the protective film, thus leaving the metal more exposed to contact with the hot gases of the furnace. In this way, the transfer of heat from the sides to the central portion of the metal is facilitated.

The protective film may have a width of up to 2 m, preferably using a protective film with a width of up to 1.5 m, which adapts to the width frequently used in aluminum rolling processes.

In some embodiments, the method further includes recovering the protective film after the heat treatment. The recovery of the protective film after the heat treatment may include:
- cooling the metal with protective film assembly;
- removing the protective film from the surface of the metal by means of separation (decoiling) and winding on an adjacent roller.

In some embodiments, the protective film may remain placed on the surface of the metal (in coils or sheets) after the thermal treatment, for subsequent stages of storage or transport of the coils or sheets.

In other embodiments, after the annealing process, the protective film is replaced by a film made of a material of the PE, PP or PVC type, or for subsequent stages of storage or transport of the coils or sheets.

A second aspect of the invention relates to a metal product (preferably rolled), obtained according to the method according to the first aspect of the invention, or in any of the possibilities thereof.

The metal product is preferably made of aluminum or of an aluminum alloy.

According to certain embodiments, the metal product has at least one preferred surface of the rolled product that is free of damage or marks caused by the metal-metal contact.

The method of the present invention prevents damage to the metal when it is subjected to a high-temperature annealing process, such that the problems and limitations posed by the existing systems and described in the previous section (damage, marks and defects) do not occur, giving rise to a resulting product with the following characteristics:
- The surfaces of the metal are not damaged (friction phenomena or pressure marks do not occur), since the protective film located between each sheet (wrap or sheet of metal) has a lower hardness than the metal and also acts as a solid lubricant.
- In the embodiments wherein a continuous protective film is used, it can be placed and removed in one single piece (either by coiling or as independent separation sheets).
- The surface of the metal is not contaminated and there are no remains to be removed after the annealing process.
- The protective film does not act as an insulating element; in fact, it can be placed without completely covering the dimensions of the metal, enabling an efficient heat transfer in the metal from different directions, which is important for the annealing process.
- The protective film used can withstand high temperatures without degrading over time.
- The protective film, unlike other solid lubricant elements, can be recovered and used several times.
- The dimensions of the protective film to be used fall within the industrial application range, for which large rolls are considered for the continuous application thereof.

The different aspects and embodiments of the invention defined above can be combined with each other, provided they are mutually compatible.

The advantages and additional features of the invention will become apparent from the following detailed description and will be particularly noted in the attached claims.

BRIEF DESCRIPTION OF THE DRAWINGS

As a complement to the description, and for the purpose of helping to make the features of the invention more readily understandable, in accordance with various practical exemplary embodiments, said description is accompanied by a set of figures constituting an integral part thereof, which by way of illustration and not limitation represent the following.

DETAILED DESCRIPTION OF THE INVENTION

Figure 1:
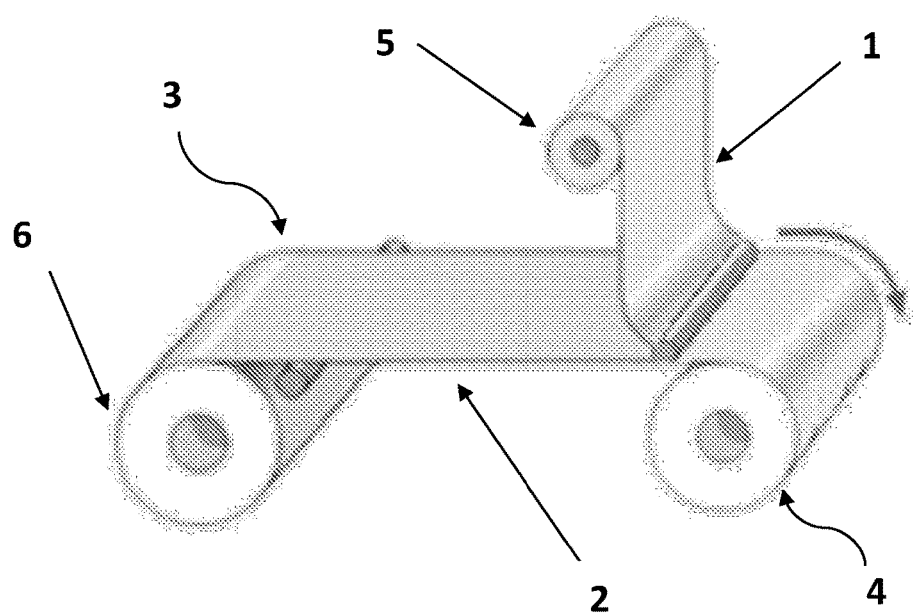
FIG. 1 shows a diagram of the continuous application of a protective film on an aluminum coil before subjecting it to an annealing process.

In the description of the possible preferred embodiments of the invention it is necessary to give many details to make the invention more readily understandable. Even so, it will be apparent to a person skilled in the art that the invention can be implemented without these specific details. Moreover, other well-known features have not been described in detail to avoid unnecessarily complicating the description.

The present invention describes a method for preserving the surface quality of a metal when it is subjected to an annealing process to adjust the mechanical characteristics (softening) thereof.

The method described is based on the use of a protective film of polytetrafluoroethylene or PTFE, better known by the trade name Teflon, or another compound resistant to high temperatures (in the range of 200° C. to 360° C.). This protective film is placed as a separation element of the metal wraps in a coil, or of sheets stacked on a pallet. The assembly of metal sheets (wraps or sheets) plus the protective film can be introduced in an annealing furnace to subject the metal to a specific program in order to adjust its final temper (desired mechanical characteristics). Normally the metal is exposed to the processing temperatures during a variable number of hours, usually between 2 and 6 hours of effective time (without considering the thermal ramp-up and ramp-down times).

The preferred quality specification for the metal correspond to defect-free surfaces and with certain optical attributes (gloss, diffusivity, specular reflectance, image clarity), which must be preserved during the annealing process, such that after said process, the metal is ready to be able to be sent to the customer or to undergo further rolling. In the first case, the protective film can be replaced with a conventional film of PP, PVC, PE, etc.

The preferred type of protective film in this invention is a polymer of the polytetrafluoroethylene or PTFE or Teflon type, produced with a thickness between 20 and 40 microns. This protective film can be supplied in rolls, with dimensions between 0.5 and 1.5 m in width and several thousand meters in length (usual industrial format in the market of rolled products). The length depends on the thickness of the metal, since standard product weights are normally considered and the smaller the thickness of the aluminum, the greater the length thereof (in a coil or when it must be cut into sheets).

The presence of the protective film during the annealing process acts as a physical barrier between each wrap or sheet of aluminum, such that it prevents the appareance of metal-metal friction defects and marks during the handling operations to introduce the material into the furnace, and it especially prevents the expansion and contraction of the metal with the temperature to cause damage on the surface thereof. Due to the nature of the protective film and the high thermal resistance thereof, there is no degradation of the protective film during the annealing operation, such that it does not leave marks or residue on the surface of the aluminum.

In case where the protective film is made of PTFE or Teflon, it can be of large dimensions and with a thickness of the order of microns; for example: 0.025 mm×1500 mm×3000 m.

FIG. 1 shows the method for protecting a metal during an annealing process, according to a first possible embodiment of the invention. In this case, the protective film (1) is placed from a parallel uncoiling system (3), wherein both surfaces (the surface of the protective film (1) and that of the metal (2) from a coil (6)) are put in contact continuously and linearly.

This process can be carried out in a machine that is already used in other operations of the wrought metals industry, such as edge trimming, leveling, surface inspection, etc. but it is susceptible to being applied directly at the outlet of the rolling mill if the design thereof allows.

Both materials are joined forming a coil 4 that alternates metal wraps with the protective film acting as a separation element. In this first preferred embodiment, the metal 2 is aluminum and the protective film 1 is made of PTFE Teflon.

Figure 5:
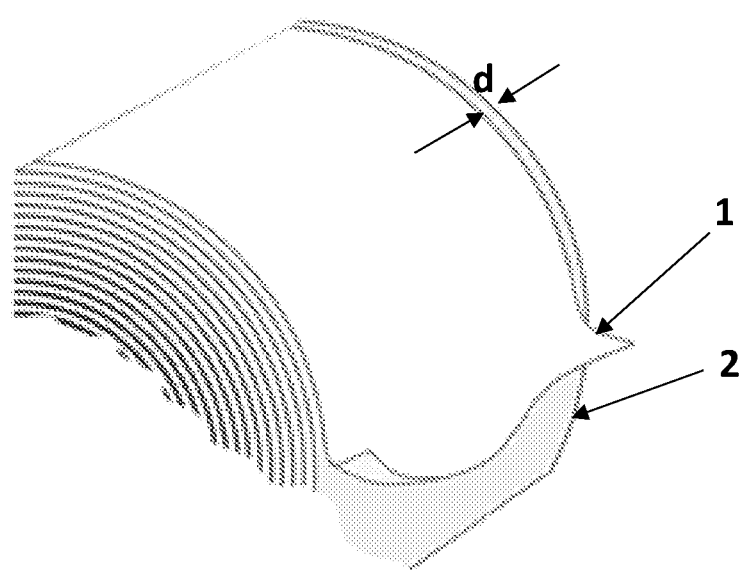
FIG. 5 shows an example of the arrangement of the protective film coiled together with the metal.

The arrangement of the protective film 1 is made considering the width of the metal 2, leaving the edge thereof exposed in order to suitable receive the heat of a furnace during the subsequent heat treatment thereof by means of annealing and prevent an overexposure of the film 1 to the hot air of the furnace, which can sometimes be at a temperature greater than 360° C. and can burn it. In this way, the metal 2 itself is heated, but at the same time acts as a heat sink of the heat from the protective film 1, thus preventing it from reaching excessive temperatures and being damaged. FIG. 5 shows an example of the placement of the protective film in a coil, leaving the edges uncovered for this reason.

Figure 2:
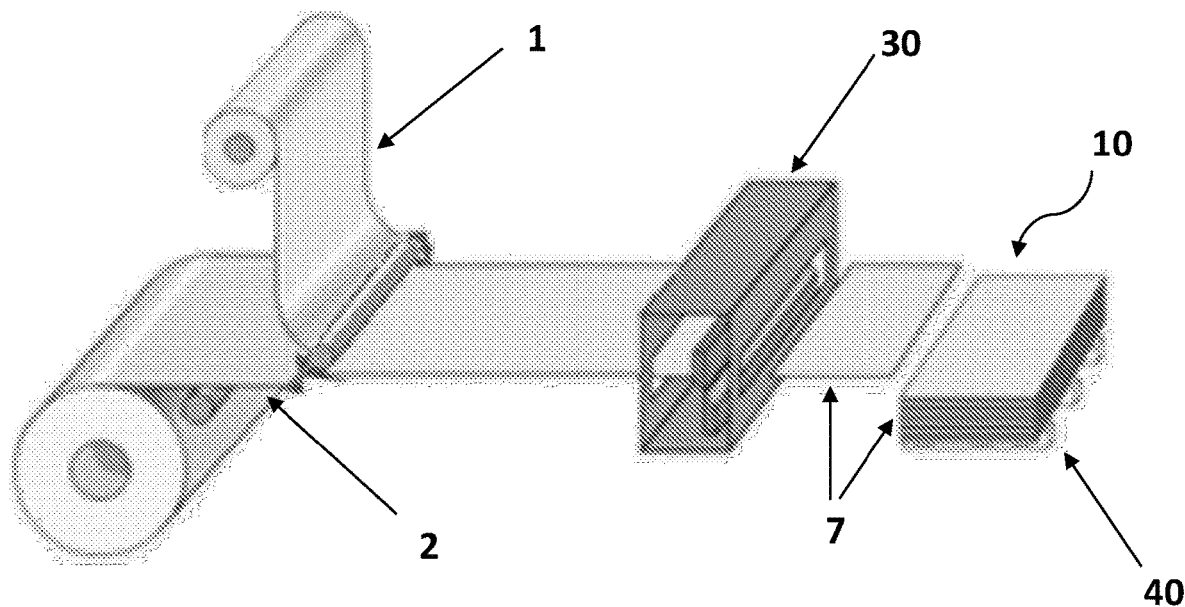
FIG. 2 shows a similar diagram in which the protective film is applied before cutting the material into sheets, such that they are stacked with the film acting as a separation surface and arranged for the subsequent annealing process.

FIG. 2 shows the method for placing the protective film 1 from a parallel decoiling system according to a second embodiment of the invention wherein both materials 1, 2 are cut by means of a shear 30 and stacked on a pallet 40 instead of being coiled again, thus forming a stack 10 of alternating layers with the film 1 acting as a separation element between the surfaces of aluminum 2.

The coil 4 or the alternating layers stack 10 is introduced into a furnace to subject the metal to an annealing process. The protective film 1 is resistant to high temperatures in the range of 200° C. to 360° C. The protective film made of Teflon does not degrade or produce residues that contaminate or stain the surfaces of the metal, but protects them during the expansion and contraction phenomena due to the lower hardness thereof and the solid lubricating effect over the metal. The chemical resistance of Teflon is an important aspect in order to make it possible for the film to contact the surface of the metal, which tends to have traces of lubricants and other organic solvents deposited during the rolling process.

Figure 3:
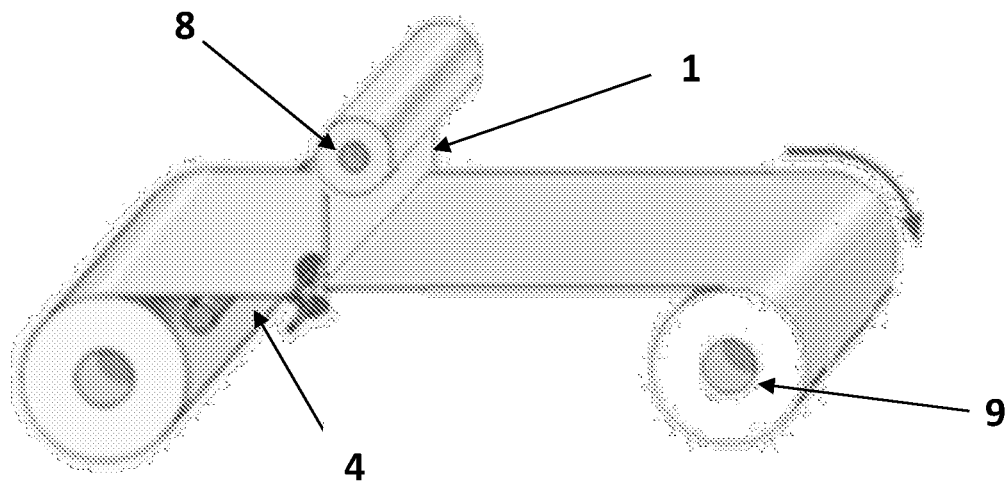
FIG. 3 represents a process for removing and recovering the film once the annealing process has finished and the metal has been cooled.

FIG. 3 shows a method for recovering the protective film 1 made of Teflon after the coil 4 has been subjected to an annealing thermal treatment and before the metal is sent to an end customer. The protective film 1 made of PTFE or Teflon can be reused several times since the chemical integrity thereof is not altered at the temperatures of the process, provided it does not suffer physical damage (tears, perforations, etc.).

FIG. 3 shows an arrangement of a recovery roller 8 for recovering the protective film 1. It is important for the roller 8 to maintain an adequate alignment and sufficient traction to be able to coil the protective film 1 without wrinkles or causing breakages, since the continuity and integrity thereof is key for a subsequent use. The final metal product 9 without the protective film 1 is coiled for the storage and/or transport thereof to an end customer.

Figure 4:
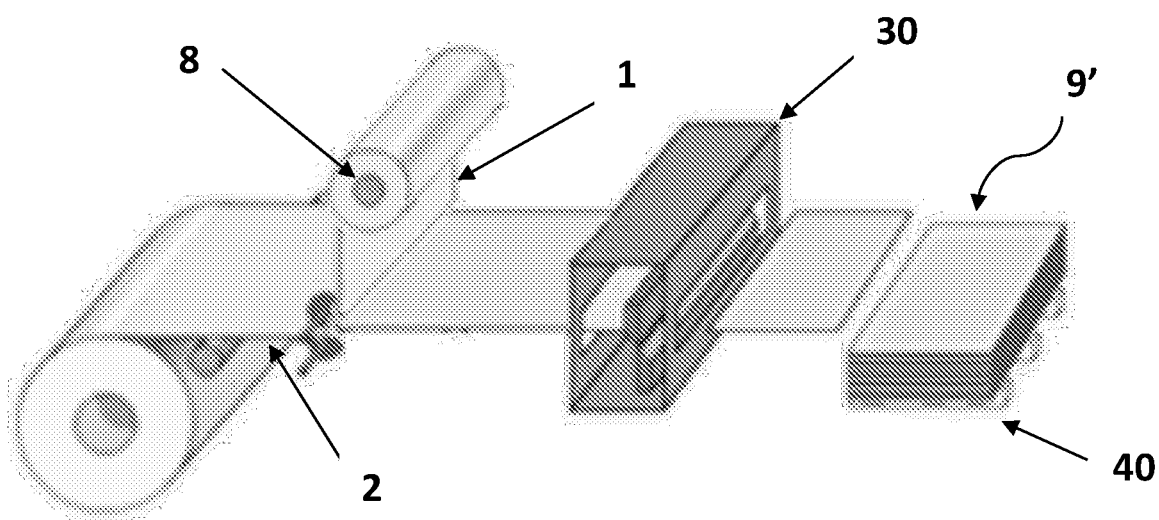
FIG. 4 shows a diagram similar to the previous Fig. showing the process for recovering the film on a roll once the metal has been annealed, and just before finishing the process with the material in blanks or sheets.

FIG. 4 shows a method according to another possible embodiment for the recovery of the protective film 1 before the storage and/or shipment of the metal to an end customer. In this embodiment, this operation is carried out in a cutting or shearing line 30. The final metal product 9' are metal sheets, which can be stacked on a pallet 40. In other embodiments, the recovery of the protective film 1 can be carried out in a coil-slitting line or in a line for applying a protective element of lower value. It is also possible that the film 1 is not removed and is sent as is to the final customer.

FIG. 5 shows an exemplary arrangement of a protective film 1 that is coiled together with the metal 2, providing a certain separation distance "d" at the edge of the metal 2 and the film 1, with the aim that is does not protrude and does not hinder the circulation of heat from the edges to the center of the aluminum web when it is subjected to the annealing process. By way of example, the protective film 1 can be placed so that there are 2-5 mm of exposed metal on each side to favor the transfer of heat from the surroundings to the metal.

In another embodiment (not shown), the position of the protective film can be adjusted to the width of the metal without the protective film protruding (to prevent it from burning during the annealing process).

The aluminum surfaces obtained by means of this method will have superior properties in terms of surface quality than by the standard process (bare metal annealing) or according to prior techniques, and they are susceptible to being used in countless applications in the decorative sector, and in particular in that of bare, lacquered and anodized aluminum, considering the marked aesthetic and general appearance improvements, and limiting the presence of common surface defects that are very visible in aluminum products with a mirror finish. Typical applications as follows:

In interior decoration, and in general in the building and construction sector.
   Interior or exterior decoration in the automotive sector.
   Lighting elements.
   Cosmetic and high gloss pieces.
   Reflective surfaces (solar industry or other technical applications).

In the same way, the possibility of being able to use this invention in the production process entails a clear improvement in terms of savings resulting from the reduction of internal rejections due to defects and a substantial improvement in the reduction of complaints from customers.

Considering these advantages, the product manufactured with this technology entails a clear commercial potential, in terms of quality improvement and savings, as well as a proposal for differentiated and high-quality surfaces.

The present invention is applicable in the field of the metallurgical industry and, in particular, of the industry related to aluminum alloys that are work hardened ("wrought alloys"). It is also applicable in the manufacture of interior decoration, building and construction, automotive, lighting, manufacturing of high-gloss cosmetic parts and reflective surfaces, for example, in the solar industry.

In light of this description and figures, the person skilled in the art may understand that the invention has been described according to some preferred embodiments thereof, but that multiple variations can be introduced in said preferred embodiments without departing from the main object of the invention as it has been claimed.

In this text, the term "comprises" and its derivations (such as "comprising", etc.) should not be understood in an excluding sense. That is, these terms should not be interpreted as excluding the possibility that what is described and defined may include more elements, stages, etc.

The invention claimed is:

1. A method for protecting a metal during an annealing process, the metal being in the form of a coil or sheets, the method comprising the steps of:
    placing a protective film between adjacent surfaces of the wraps of the coil or of the sheets, such that the protective film separates the adjacent surfaces of the metal; and
    subjecting the metal with the protective film to the annealing process;
    wherein the protective film is resistant to temperatures between 200° C. and 360° C., and
    wherein the protective film is recoverable after the annealing process.

2. The method of claim 1, wherein the protective film is composed of a material selected from: polytetrafluoroethylene or PTFE, a fiberglass fabric, a polyparaphenylene terephthalamide fabric, a silicone compound or a fiberglass or polyparaphenylene terephthalamide fabric impregnated with polytetrafluoroethylene, or a combination of one or more of the above.

3. The method of claim 1, wherein the protective film is made of polytetrafluoroethylene.

4. The method of claim 1, wherein the protective film has a thickness greater than 0.01 mm.

5. The method of claim 1, wherein the protective film has a thickness between 0.02 mm and 0.04 mm.

6. The method of claim 1, wherein the step of placing of the protective film between the adjacent surfaces of the metal includes placing the protective film continuously, covering an entire length of the surface of the metal.

7. The method of claim 1, wherein the step of placing of the protective film between the adjacent surfaces of the metal includes placing the protective film covering 100% of the width of the surface of the metal.

8. The method of claim 1, wherein the step of placing the protective film between the adjacent surfaces of the metal includes placing the protective film covering at least 80% of a width of the surface of the metal.

9. The method of claim 1, wherein the protective film has a width of up to 2 m.

10. The method of claim 1, wherein the protective film has a width of up to 1.5 m.

11. The method of claim 1, wherein the metal is aluminum or an aluminum alloy.

12. The method of claim 1, further comprising the step of recovering the protective film after the annealing process.

13. The method of claim 12, wherein recovering the protective film after the annealing process comprises:
    cooling the metal with the protective film; and
    removing the protective film from the surface of the metal by means of uncoiling and winding on a core.

* * * * *